United States Patent
Nagaraj et al.

(10) Patent No.: US 9,253,496 B2
(45) Date of Patent: Feb. 2, 2016

(54) INTELLIGENT DECODED PICTURE BUFFERING

(75) Inventors: Raghavendra Nagaraj, San Diego, CA (US); Stephen A. Molloy, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1436 days.

(21) Appl. No.: 12/333,781

(22) Filed: Dec. 12, 2008

(65) Prior Publication Data

US 2010/0150223 A1   Jun. 17, 2010

(51) Int. Cl.
- H04N 7/12 (2006.01)
- H04N 19/423 (2014.01)
- H04N 19/70 (2014.01)
- H04N 19/44 (2014.01)

(52) U.S. Cl.
CPC ............. *H04N 19/423* (2014.11); *H04N 19/44* (2014.11); *H04N 19/70* (2014.11)

(58) Field of Classification Search
USPC .............................................. 375/240, 240.1
See application file for complete search history.

(56) References Cited

U.S. PATENT DOCUMENTS

| | | | |
|---|---|---|---|
| 6,704,846 B1 | 3/2004 | Wu et al. | |
| 6,996,178 B1 * | 2/2006 | Zhang et al. | 375/240.16 |
| 8,385,431 B2 * | 2/2013 | Ohbitsu | H04N 19/58 348/415.1 |
| 8,718,154 B2 * | 5/2014 | Yoo | H04L 27/2665 375/260 |
| 2002/0092030 A1 | 7/2002 | Gu | |
| 2002/0154700 A1 * | 10/2002 | Tardif | G06T 3/4084 375/240.25 |
| 2003/0187824 A1 | 10/2003 | MacInnis et al. | |
| 2004/0151248 A1 | 8/2004 | Kondo et al. | |
| 2008/0279280 A1 | 11/2008 | Iguchi et al. | |
| 2010/0002776 A1 * | 1/2010 | Lee | 375/240.25 |
| 2011/0274167 A1 * | 11/2011 | Zhang | H04N 1/234381 375/240.12 |

FOREIGN PATENT DOCUMENTS

| | | |
|---|---|---|
| CN | 1596545 A | 3/2005 |
| CN | 1703098 A | 11/2005 |
| CN | 101026762 A | 8/2007 |
| EP | 1511325 A2 | 3/2005 |
| EP | 1622391 A1 | 2/2006 |
| EP | 1750446 A2 | 2/2007 |
| JP | 10210484 A | 8/1998 |
| JP | 2000115777 A | 4/2000 |

(Continued)

OTHER PUBLICATIONS

Modified polyharmonic data broadcasting scheme for popular videos, Chand et al, IEEE 2005.*

(Continued)

*Primary Examiner* — Luu Pham
*Assistant Examiner* — Jahangir Kabir
(74) *Attorney, Agent, or Firm* — Steven Thiel; Elaine H. Lo

(57) ABSTRACT

A system and method for intelligent decoded picture buffering is described. In one embodiment, a video bitstream buffer receives and temporarily holds an encoded compressed bitstream containing portions of a video. Then, a look ahead parser scans ahead in the video to analyze portions of the encoded video bitstream in the video bitstream buffer to predict the value of the video. Based on this prediction, an intelligent memory manager prioritizes the video portions, and then sends the high valued video portions to a first buffer and sends the low valued video portions to a second buffer.

20 Claims, 4 Drawing Sheets

(56) References Cited

FOREIGN PATENT DOCUMENTS

| JP | 2006031480 A | 2/2006 |
|---|---|---|
| JP | 2006166308 A | 6/2006 |
| JP | 2006279330 A | 10/2006 |
| JP | 2008048178 A | 2/2008 |
| JP | 2008278423 A | 11/2008 |
| TW | 200838310 A | 9/2008 |
| WO | 9836576 A1 | 8/1998 |
| WO | 03041415 A1 | 5/2003 |

OTHER PUBLICATIONS

Efficient utilization of buffer storage in conservative staircase broadcasting scheme, Chand et al, IEEE 2008.*

International Search Report and Written Opinion—PCT/US09/067725, International Search Authority—European Patent Office, May 11, 2010.

Bruce Jacob, Trevor Mudge, "Virtual Memory: Issues of Implementation", IEEE Computer vol. 31, Issue 6, Jun. 1998, pp. 33-43.

Taiwan Search Report—TW098142645—TIPO—Feb. 20, 2013.

* cited by examiner

INTELLIGENT DECODED PICTURE BUFFERING

TECHNICAL FIELD

Embodiments of the invention relate to multimedia video decoding and intelligent decoded picture buffering of decoded portions of video.

BACKGROUND

Video technology is very popular for showing moving images to consumers. Video is a sequence of still images representing scenes of a motion picture that can be electronically captured, recorded, processed, stored, transmitted, and reconstructed. Video can be stored in digital and analog storage formats. Digital storage formats include DVDs, QuickTime, and MPEG-4. Analog storage formats include VHS and Betamax videotapes.

Video compression refers to a data compression process of encoding and reducing the quantity of data used to represent video images. Video compression is typically performed prior to sending and the later decoding of video data to a destination. Video compression standards include MPEG-2, H263, MPEG-4 Part 2, and H264/AVC. The H264 standard provides high quality video at low bit rates compared to previous standards.

Video compression can be accomplished because video data contains spatial and temporal redundancies. These redundancies make uncompressed video streams inefficient. In one technique, video compression reduces spatial redundancies through intraframe compression by registering differences between parts of a single frame. Likewise, video compression reduces the temporal redundancies through interframe compression by registering differences between frames.

Video resolutions include standard definition and High Definition (HD) video. HD video generally refers to any video system of higher resolution than standard-definition video. HD video resolutions include 1280×720 (720p) or 1920×1080 (1080i or 1080p). HD video results in better visual clarity, but occupies more memory storage space.

In video encoding, a system's maximum rate of data transfer is its digital bandwidth. In other words, bandwidth is the amount of data a computer can transfer data over a data channel. Bandwidth can be measured as a bit rate, expressed in bits per second, denoting the maximum bit rate that data can be transferred through a connection. In computer networking, bandwidth management is a process of measuring and controlling the amount of data communicated across a network channel, to avoid filling the channel to its capacity, which would result in network congestion and poor performance. As such, bandwidth savings help prevent poor video performance.

In a conventional video decoder, an encoded bitstream is input into the system. In one technique, the encoded bitstream can be entropy decoded to form a residual. The residual can then be inverse-scanned, inverse-quantized, and inverse-transformed. Then, a motion compensation module uses previous or future frames to generate an inter macroblock predictor, or a spatial compensation module uses neighboring macroblocks to generate an intra macroblock predictor. The MPEG4/H263 standard only supports inter predictors, whereas the H264 standard supports both inter and intra predictors. The predictor macroblock can be added to the scanned, quantized, and transformed residual. This result can be filtered and then outputted as a reconstructed and decoded macroblock.

The inter macroblock predictor can be formed from different sized blocks, including integer multiples of variable sized non-overlapping blocks called partitions and sub-partitions. MPEG4/H263 supports either one 16×16 macroblock or four 8×8 blocks or partitions. H264 supports one 16×16 macroblock, two 16×8, two 8×16, or four 8×8 blocks or partitions. H264 further supports each 8×8 partition to be sub-divided into one 8×8 partition, two 8×4 sub-partitions, two 4×8 or four 4×4 sub-partitions. Each partition or sub-partition can have a separate motion vector that describes which reference frame to use, and the location in the reference frame to gather the predictor partition or sub-partition. These reference frames can be temporarily stored and organized in a decoded picture buffer in a memory. The decoded picture buffer can provide pictures or frames to a decoding pixel processor (i.e., a decoder). A video decoder maintains several buffers in memory that the decoder reads from and writes to during the course of decoding a video bitstream. These reads and writes include video bitstream read/write, a system bitstream read/write, a command buffer read/write, and motion vectors read/write. The sending and receiving of referenced decoded portions of video between the decoded picture buffer and the decoding pixel processor is often the largest consumer of bandwidth.

The decoded portion of video can be referenced by the decoder once, or referenced multiple times. The more often a portion of video is referenced, the more bandwidth it takes up. If the portion of video is referenced frequently, more bandwidth is consumed than if the decoded video portion is not referenced frequently. This is because the decoded video portion is transmitted from the decoded picture buffer to the decoder each time the decoded video portion is referenced, consuming bandwidth during each transmission.

SUMMARY

One embodiment is a video data buffering system comprising a look ahead parser configured to predict a value of a decoded portion of video data by looking ahead at an encoded portion of a video data bitstream corresponding to the decoded portion of video data, a decoder configured to decode the encoded portion of the video data bitstream, and a memory manager configured to store the decoded portion of video data in a first buffer in a first memory or in a second buffer in a second memory based on the predicted value of the decoded portion of video data.

In another embodiment, there is a method of buffering video data, the method comprising predicting a value of a decoded portion of video data by looking ahead at an encoded portion of a video data bitstream corresponding to the decoded portion of video data, decoding the encoded portion of the video data bitstream, and determining whether to store the decoded portion of video data in a first buffer in a first memory or in a second buffer in a second memory based on the predicted value of the decoded portion of video data.

In another embodiment, there is a video data buffering system comprising means for predicting a value of a decoded portion of video data by looking ahead at an encoded portion of a video data bitstream corresponding to the decoded portion of video data, means for decoding the encoded portion of the video data bitstream, and means for determining whether to store the decoded portion of video data in a first buffer in a first memory or in a second buffer in a second memory based on the predicted value of the decoded portion of video data.

In another embodiment, there is a computer readable medium containing software that, when executed, causes the computer to perform the acts of predicting a value of a decoded portion of video data by looking ahead at an encoded portion of a video data bitstream corresponding to the decoded portion of video data, decoding the encoded portion of the video data bitstream, and determining whether to store the decoded portion of video data in a first buffer in a first memory or in a second buffer in a second memory based on the predicted value of the decoded portion of video data.

In another embodiment, there is a video data buffering system comprising a look ahead parser configured to identify and mark a skipped portion of video data that has been encoded, a decoder configured to decode the skipped portion of video data, wherein the decoded skipped portion of video data has a corresponding identical decoded portion of video data, and a memory manager configured to store the decoded skipped portion of video data and the corresponding identical decoded portion of video data in a single reference memory location.

DETAILED DESCRIPTION

Figure 1:
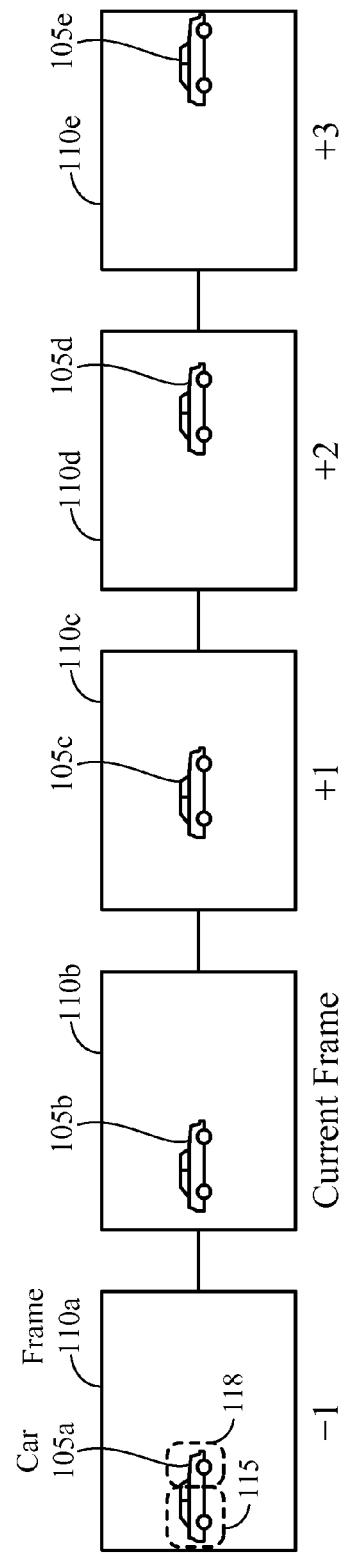
FIG. 1 is a block diagram illustrating a group of frames in a video bitstream.

A system and method for intelligent decoded picture buffering is described. In one embodiment, a video bitstream buffer receives and temporarily holds an encoded compressed bitstream containing portions of a video. In one embodiment, the buffer holds one or more frames of video from an incoming video bitstream. A look ahead parser then scans ahead in the video bitstream buffer to analyze portions of the encoded video bitstream in the video bitstream buffer to predict a "value" of the decoded video portion. In one embodiment, the value of the decoded video portion relates to how often that video portion will be referenced by later video frames. For example, video frames that are determined to be referenced multiple times may be set with a high value, while video frames that are not referenced by other video frames may be set with a low value. Based on this look-ahead prediction of the value of the video, an intelligent memory manager prioritizes the different decoded video portions in the decoded picture buffer. Highly valued video portions may be sent to a first buffer that has a very fast access time, and lower valued video portions may be sent to a second buffer with a slower access time.

In one embodiment, the high valued video portions are stored in a first internal memory, and the low valued video portions are stored in a second external memory. Using such a strategy, bandwidth, power, and financial cost savings can be achieved compared to storing all decoded video portions in a single memory. In one embodiment, the internal memory may be cache memory and the external memory may be random access memory (RAM). In handheld and mobile applications, saving power, bandwidth, and financial cost are critical.

This detailed description is directed to certain specific embodiments of the invention. However, the invention can be embodied in a multitude of different ways. In this description, reference is made to the drawings wherein like parts are designated with like numerals throughout. More particularly, it is contemplated that the embodiments may be implemented in or associated with a variety of electronic devices such as, but not limited to, mobile telephones, wireless devices, and personal data assistants (PDAs).

As used in herein, a "video portion" includes encoded and decoded video portions. Encoded video portions include a portion of a video file or bitstream before decoding. Decoded video portions are a decoded version of the encoded video portion and the decoded video portions can have a value associated with them. The video portion may include: multiple video frames, one video frame, fragments of video frames, slices, pixels, decoded picture buffer pages, chunks, fragments, pieces, portions, bits, pictures, blocks, macroblocks, submacroblocks, partitions, or sub-partitions of frames. As is known, multiple video blocks form a macroblock, and multiple macroblocks form a slice. Multiple slices form a frame, and multiple frames in turn form a video. In one embodiment, each decoded video portion is the same size. In another embodiment, the decoded video portions may correspond to variable sizes in the memory.

Also as used in herein, a "high valued" portion of video is a video portion that is more important from a video decoding perspective than a low valued portion of video. High valued video portions may include video portions (e.g., frames, macroblocks) that are more regularly used in decoding in comparison to other video portions. For example, if a parser predicts that a video portion will be referenced frequently, the video portion can be considered high valued. Also as an example, high valued video portions may be frequently accessed by other decoded video portions in the bitstream. High valued video portions may be frequently referenced by motions vectors from later video portions. Conversely, low valued video portions may include video portions that are infrequently referenced video portions.

Also as used herein, "predicting the value" of a video portion can include predicting the level of importance of a video portion during the decoding process. In one embodiment, the prediction is based on the number of times a video portion (e.g., frame) is referenced in an encoded bitstream or video bitstream buffer. This prediction can be an exact determination, or alternatively, this prediction can simply be an estimate based on the how often a video portion is expected to be referenced by later video frames.

A "referenced" video portion may include video portions that have already been decoded, but are used to determine a later decoded video portion. Referencing a video portion can also be referred to as accessing a video portion.

FIG. 1 is a block diagram illustrating a time sequence of video frames 110a-e in a video bitstream. The frames 110a-e show a car 105a-e which moves from left to right within each video frame, as the frames 110 progress in time from time −1 to time +3. In one embodiment, the video bitstream is analyzed at time −1 to predict the most referenced macroblocks in the upcoming frames. In frame −1, the macroblocks 115, 118 containing the car 105 are later referenced by the current frame, frame +1, frame +2, and frame +3. As such, the macroblocks 115, 118 which include the car 105 may be determined to be frequently referenced. In one embodiment, the frequently referenced macroblocks are stored in a memory location that provides faster access time to the processor, in comparison to other macroblocks, as explained with reference to FIG. 2.

Figure 2:
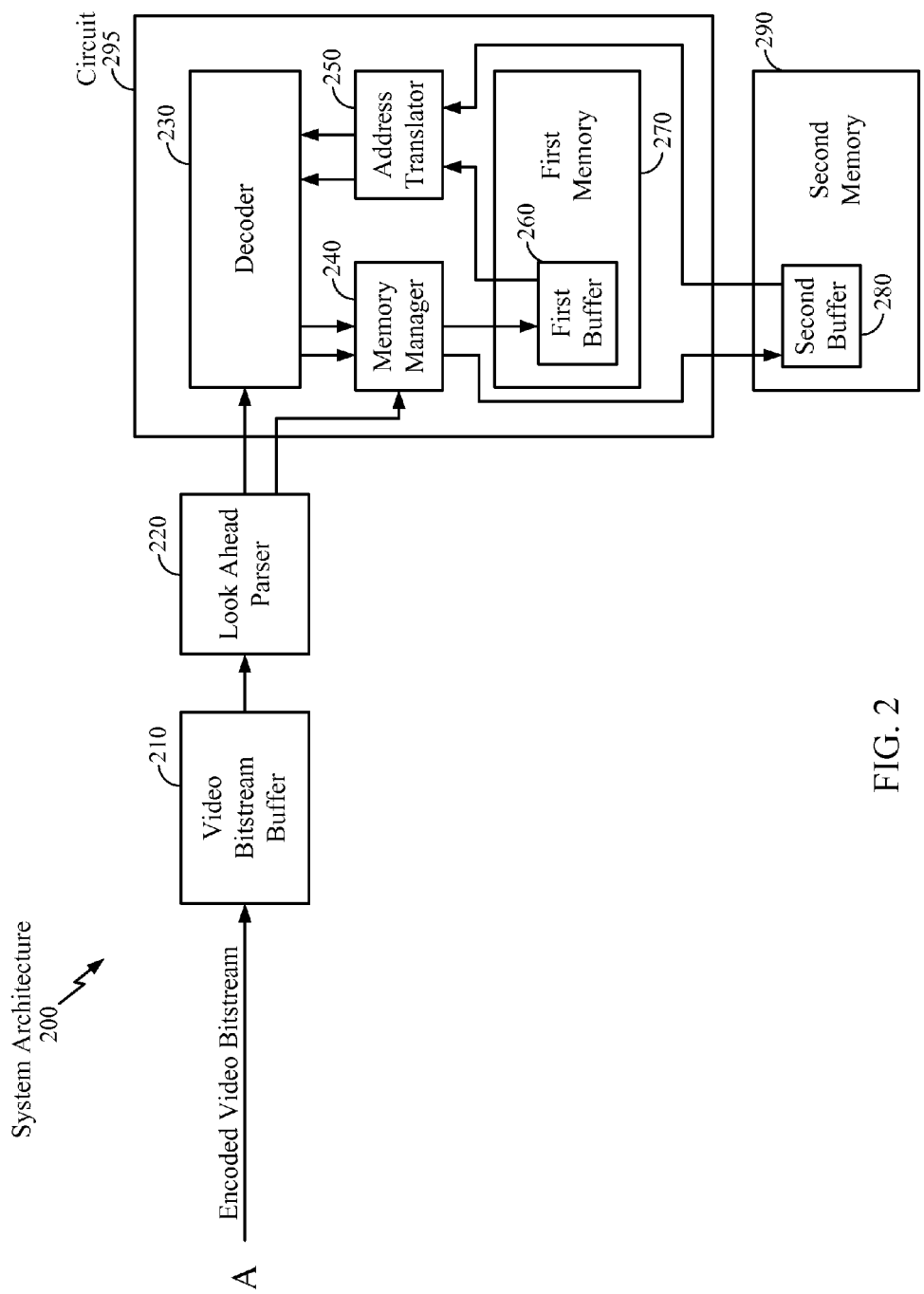
FIG. 2 is a block diagram illustrating a system for intelligent decoded picture buffering.

FIG. 2 illustrates a system architecture 200 for intelligent decoded picture buffering. The system 200 includes an encoded video bitstream A, that is processed by a video bitstream buffer 210 to a look ahead parser 220 and finally into a circuit 295. The circuit 295 includes a decoder 230, a memory manager 240, an address translator 250, and a first buffer 260 in a first memory 270. External to the circuit 295 is a second buffer 280 in a second memory 290.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps are described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The encoded video bitstream A in FIG. 2 may comprise compressed video data so that the video data can be efficiently sent over a medium, such as air. The video bitstream buffer 210 can temporarily store the compressed video data until it is ready to be decoded by the decoder 230. Thus, the decoder 230 provides one means for decoding the encoded portion of the video data bitstream.

After the compressed video bitstream is temporarily stored in the buffer 210, it is available to the look ahead parser 220. The look ahead parser 220 can scan through the encoded video portions in the video bitstream buffer 210 to predict which video portions of the compressed bitstream are the most likely to be high valued to the decoder. Thus, the look ahead parser 220 provides one means for predicting a value of a decoded portion of video data by looking ahead at an encoded portion of a video data bitstream corresponding to the decoded portion of video data.

In one embodiment, this prediction is accomplished by assigning a value to each video portion. In one embodiment, this value is stored in a prioritized table (not shown) monitored by the memory manager 240. In one embodiment, the decoded video portion is sent to the first buffer 260 when the predicted value is greater or equal to a threshold, and then sent to the second buffer 280 when the predicted value is less than a threshold. In one embodiment, the value is related to a predicted bandwidth of the decoded video portion. In another embodiment, the value is related to a predicted lifespan of the decoded video portion, or a predicted bandwidth variation of the decoded video portion over the lifespan. In another embodiment, the value is related to how many times the encoded video portion is predicted to be referenced in the decoder 230 by later frames in the video bitstream. The parser 220 can send the encoded video portions to the decoder 230, and send the predicted values to the memory manager 140.

The look ahead parser 220 is configured to look forward in time to an encoded portion of video, before decoding, and predict a value for the corresponding decoded video portion after decoding. In one embodiment, the bandwidth of a decoded video portion is computed as the sum of the total read times and the total write times of video portions by the decoder in the system, divided by the total lifespan of the video portion. In other words, the bandwidth is related to amount of referencing a particular frame or frames of video undertake. As such, the parser 220 can proactively and intelligently look ahead at the encoded video portions to either quantitatively determine, or predict, which decoded video portions will be referenced frequently.

To exploit data locality, the reference patterns usually may be determined at least several frames ahead of time. For this reason, by the time a video frame is decoded, it may be too late to exploit data locality. Therefore, the look ahead parser 220 may determine ahead of time which video portions are referenced more frequently. For example, the parser 220 can look ahead a given number of encoded video portions (e.g., 15 frames), and look at the motion vectors of those later frames in the video bitstream buffer. The parser 220 can then determine for each frame how many other frames it refers back to through analysis of the motion vectors associated with each frame.

Also, the parser 220 may determine which video portions are referenced frequently, and which video portions are not referenced frequently. In one embodiment, the frequently accessed video portions (e.g., frames) are stored in an internal closer memory (e.g., eDRAM), whereas the less frequently accessed video portions are stored in an external further memory (e.g., SDRAM).

As one example, the parser 220 may look forward 15 frames by retrieving those frames from the video bitstream buffer 210. For each of the 15 frames, the look ahead parser 220 determines the motion vectors associated with each frame. The parser then identifies the frames which are referenced by each motion vector. The frames that are referenced by more than a threshold number of motion vectors are then determined to be stored within the first memory 270, so that they can be retrieved quickly by the decoder 230. The frames that are referenced by fewer than the threshold number are stored in the second memory 290 since they are required less frequently by the decoder 230.

The further that the parser 220 looks ahead, the more accurate the value prediction can be. The look ahead parser 220 can perform embodiments of full and partial parsing. In an embodiment of full parsing, the look ahead parser 220 scans ahead and views the entire compressed video. In this scenario, the parser 220 determines exactly how many times a particular video portion is referenced. In one embodiment of full parsing, the look ahead parser 220 can make a single determination of which frames are most referenced, and store those frames in the first memory. In another embodiment of full parsing, the look ahead parser 220 may still compute the number of accesses only one time, but use this knowledge to continually re-allocate which video portions are stored in the first memory. In an embodiment of full parsing, both motion vectors and reference indices are reconstructed to obtain the most accurate bandwidth information. Although full parsing can produce a precise determination of the value of a video portion, this process is relatively complex and time consuming and may be inappropriate for real-time video decoding, depending on the computational power of the decoding system.

The look ahead parser 220 can also perform "partial parsing." In partial parsing, only partial video data is reviewed by the look ahead parser 220. In an embodiment of partial parsing based on the reference type, only reference indices, and not the motion vectors, are reconstructed. In another embodiment of partial parsing, neither reference indices nor motion vectors are reconstructed, but only slice level headers are reconstructed. As a result, embodiments of partial parsing obtain less accurate bandwidth information since the motion vectors are not decoded. However, while the information may be less accurate, it generally faster to process, and thus may be more appropriate for real-time situations. Thus, partial parsing may not determine whether motion vectors are integers or fractions, and thus may affect the accuracy of the bandwidth calculation.

In another embodiment of partial parsing, the look ahead parser 220 scans less than the entire encoded bitstream. For example, only every other frame may be analyzed by the look ahead parser 220. While scanning more frames of the bitstream leads to a more accurate prediction of which frames, or macroblocks, may be referenced more often, this also requires a high level of computational overhead. Often, scanning less than the entire video stream is more practical. In partial parsing, the look ahead parser 220 may make a prediction of which video portions have the highest value based on reviewing a snapshot in time of the video portions stored within the buffer.

The number of frames that are previewed as part of the looked ahead process may vary. In one embodiment, the number of frames ahead that are viewed is proportional to the size of the video bitstream buffer 210. In another embodiment, the parser 220 scans ahead several frames, such as 1-5 frames, 6-10 frames, 11-15 frames, 16-20, or 21-25 frames, etc.

As an example, explaining the prediction aspect of the parser 220, when the look ahead parser 220 reads the next 15 frames ahead it knows the values of each macroblock within those frames. However, the parser 220 may also need to predict the value of any frames beyond those next 15 frames. The more frames scanned ahead, and as the video is progressed further, the more accurate the prediction can be.

The value of a video portion can be non-uniform over time. For example, as time progresses, high valued video portions can convert into low valued portions. When this occurs, the manager 240 can send the low valued video portions contained in the first, high performance buffer 260 to the second buffer 280. Likewise, low valued video portions can become high valued video portions. When this occurs, the manager 240 can send the high valued video portion from the second buffer 280 to the first buffer 260. When the value is based on bandwidth, the bandwidth of each decoded video portion in the first buffer can be larger than the bandwidth of each decoded video portion in the second buffer. In partial parsing, the parser 220 can regularly update its prediction of the video portions contained in the first buffer 260 and the second buffer 280. In full parsing, the manager 240 can prioritize the video portions in the buffers based on the current predicted values of the decoded video portions.

The look ahead parser 220 has at times been described above as looking ahead at given number of frames. However, the look ahead parser 220 can look ahead at any portion of video.

The decoder 230 within the circuit 295 reconstructs video portions so that they can be viewed by a user. In one embodiment, the decoder 230 is referred to as a pixel processor. The decoder 230 may reference previously decoded video portions obtained through the address translator 250, in order to decode the current video portion.

The memory manager 240 is connected to the output of the decoder 230 and can allocate decoded video portions between the first buffer 260 in the first memory 270 and the second buffer 280 in the second memory 290 based on their predicted value by the parser 220. High valued video portions can be placed in the first buffer 260. Conversely, low valued video portions can be placed in the second buffer 280. Thus, the memory manager 240 provides one means for determining whether to store the decoded portion of video data in the first buffer 260 in the first memory 270 or in the second buffer 280 in the second memory 290 based on the predicted value of the decoded portion of video data.

In one embodiment, the manager 240 organizes the video portions in a table in order from most valuable to least valuable. In one embodiment, the first buffer is filled before the second buffer is used. For example, the manager 240 can fill the first buffer 260 with the most valuable pieces (e.g., large bandwidth decoded video portions), and then send the remaining pieces into the second buffer 280.

The manager 240 can also re-organize and discard video portions in the first buffer 260 and the second buffer 280. In full and partial parsing, the high valued video portions can change over time. Therefore, the manager 240 can re-organize the first buffer 260 and second buffer 280 so that the high valued video portions remain in the first buffer 260. Also, when a video portion is no longer referenced, the manager 240 can discard this retired video portion.

This intelligent system and process is distinguishable from a conventional cache. The conventional cache is usually associated with a deterministic replacement policy such as FIFO (First-in First-out). The conventional cache is usually associated with a deterministic mapping strategy such as direct mapped or set-associative. Such deterministic strategies are not likely to "net" the high valued video portions in the cache. The conventional cache is a temporary storage area where frequently referenced data can be stored for rapid access. In a conventional cache, once the data is stored in cache, future use can be made by referencing the cached copy rather than re-fetching or re-computing the original data. The conventional cache reduces access times to data that would otherwise be fetched from a computer's main memory. However, the conventional cache is not intelligent. The conventional cache passively holds onto data. The conventional cache only has knowledge of the address of the data which it duplicates, and a system simply checks the conventional cache when data is needed, and the data is either in the cache or is not in the cache. The conventional cache does not proactively look ahead into future frames. Therefore, the conventional cache would not have time to predict or determine which data is important. As such, the conventional cache does not make decisions based on the predicted value of a video portion. Further, the conventional cache does not predict the bandwidth taken up by an encoded portion of video. Thus, the conventional cache is distinguishable from a system and method of intelligent decoded picture buffering. In one embodiment, the first memory 270 and the second memory 290 are not cache.

A given frame or image can be referenced by the decoder 230 multiple times during its lifetime. The multiple accesses of the reference frames (data-locality) usually do not occur within short time durations, such as the time required to process one macroblock. Instead, data locality typically occurs over the span of several frames. Since the references do not occur within a short time or space span, data locality can not be exploited by the conventional cache. In such a scenario, holding the highly referenced frames within an internal or closer memory (e.g., eDRAM) would be useful to prevent the given frame from having to be loaded from external memory over and over again, contributing to the overall external memory bandwidth, since motion compensation bandwidth represents a large contributor to overall video decoding bandwidth. In one embodiment of the present invention, the high valued video portions are stored in a first memory (e.g., internal memory) and the low valued video portions are stored in a second memory (e.g., external memory). In another embodiment, the first buffer is filled before the second buffer is used.

The ability of the manager 240 to send decoded video portions for referencing to at least two memories is also distinguishable from a system that stores all decoded video portions in only one of an internal memory or an external memory. For large video applications, such as HD video, storing all video data in internal memory would require a very large eDRAM, which would be very expensive and not practical. Alternatively, storing all HD video data into a SDRAM would use significant bandwidth and power, which is not ideal for communication devices. In one embodiment of the present invention, the manager 240 prioritizes video portions by storing the most frequently accessed video portions in an internal memory (e.g., eDRAM) and the remaining video portions in an external memory (e.g., SDRAM). As a result of this prioritization, financial cost and bandwidth savings can be achieved.

Before a video portion is decoded, the manager 240 can allocate space in the first buffer 260. In one embodiment, the manager 140 retires video portions that are no-longer high valued (e.g., no longer expected to contribute to bandwidth). In another embodiment, the manager 140 allocates available memory space in the first buffer 260 in anticipation of high valued video portions.

The manager 240 can allocate decoded video portions sparsely or frequently in different embodiments. In a sparse allocation embodiment, the manager 240 initially allocates a decoded video portion between the first memory 260 and the second memory 280 based on its value. Once this allocation is made, this sparse allocation embodiment allows the video portions to remain in the allocated memory until the frame is retired (i.e., no longer referenced). In other words, the video portion is not frequently transferred back and forth between the first buffer 260 and the second buffer 280 once the initial allocation decision is made by the manager 240. Although this is a more rigid embodiment, this procedure is less complex to implement than a more frequent allocation embodiment.

In a frequent allocation checking embodiment, a decoded video portion is initially allocated to the first buffer 260 or the second buffer 280 by the manager 240 based on its value. In this embodiment, the manager 240 is constantly checking the value of the decoded video portions to see if they should be reallocated. In this embodiment, the manager 240 may sort video portions in a table based on their value, to ease the identification of which video portions should be reallocated.

The address translator 250 is also connected to the decoder 230. The address translator 250 can perform a checking function and a translation function. In the checking function, the address translator 250 can check the first memory 270 and the second memory 290 during decoding to determine if the memory references will be routed from the first memory 270 or the second memory 290. Though, the address translator 250 does not need to directly (e.g., physically) check the first memory 270 or the second memory 290, as the address translator 250 can access page tables instead. A page table can be generated by memory manager 240 and can contain a translated address entry. The address translator 250 can access the translated address entry to determine if the memory references will be routed from the first memory 270 or the second memory 290. In the translation function, the address translator 250 can support an illusion of a virtual memory by translating a virtual address of the second memory 290 to a physical address of the first memory 270 on the fly.

The concept of page tables has comparable uses in virtual memory concepts. Virtual memory concepts have been used in conventional computer architecture to automate movement of instructions and data between a main memory and SDRAM to give the appearance of single large storage.

In one embodiment of the present invention, the first memory 270 stores the high valued video portions in a physical address space. The physical address of the first memory 270 does not need to be translated. The low valued video portions can be stored in the second memory 290, where the address of the second memory 290 can be represented by a virtual address. Then, the address translator 250 can support an illusion of a virtual memory by translating the virtual address of the second memory 290 to a physical address of the first memory 270 on the fly. As a result, the first memory 270 can be used as a virtual memory containing the data from the second memory 290. In one embodiment, the address translator 250 supports virtualization between an eDRAM and an SDRAM. The address translator 250 can be implemented as a translation lookaside buffer.

The first buffer 260 and second buffer 280 can be decoded picture buffers that store decoded video portions in the first memory 270 and the second memory 290, respectively. In one embodiment, the decoded picture buffer is designed to be large enough to store six to eight video frames.

Two examples of memory are embedded dynamic random access memory (eDRAM) and synchronous dynamic random access memory (SDRAM). eDRAM is a local or internal memory typically integrated on the same card, die, or package as a main ASIC, or the decoding processor, unlike a typical SDRAM. Embedded memory permits much wider buses and higher operation speeds. However, eDRAM is much more expensive to manufacture, partly because several dies have to be packaged in one chip. SDRAM has a synchronous interface, meaning that SDRAM will wait for a clock signal before responding to control inputs. Therefore, SDRAM is synchronized with the computer's system bus. Power and bandwidth are critical in communication devices. eDRAM has the advantages of a lower bandwidth and power consumption, but the disadvantages of a lower memory density and higher financial cost compared to SDRAM.

The first memory 270 can be integrated with the decoder 230 on the circuit 295. By being internal, the video portions in the first memory 270 are closer to the decoder 230, and thus contribute less to the overall video bandwidth, thus saving power. In one embodiment, the first memory is an eDRAM. In another embodiment, the first memory 270 is closer than the second memory 290. In another embodiment, the first memory 270 has faster access times than the second memory 290.

The second memory 290 can be external to the circuit 295. By being external, the video portions in the second memory 290 contribute more to the overall video bandwidth, but allow the first memory 270 to be designed smaller and therefore less expensive. An external memory that allows for a reasonably sized closer memory can be desirable for practical applications. In one embodiment, the second memory 290 is an SDRAM. In another embodiment, the second memory 290 is further away or slower than the first memory 270.

The circuit 295 can be any component that inputs video data, such as a video display controller or a video display processor. The circuit 295 can have additional components not shown in FIG. 2, such as additional memories, buffers, parsers, and processors, without departing from the spirit of the invention.

In one embodiment, the system lowers bandwidth and power by storing the more frequently referenced video portions in a buffer that is closer to a processor. In another embodiment, the high value video portions are discovered and sent to a buffer in an internal memory where they can be accessed faster, lowering bandwidth and saving power. As additional video portions are stored in the nearby buffer, additional bandwidth savings are achieved. In one embodiment, where financial cost is not a concern, all of the decoded video portions are stored in the nearby buffer. In another embodiment, the decoded video portions are divided between the first buffer 260 and the second buffer 280 based on the predicted value.

Conversely, there is an advantage to storing at least some video portions in the external memory buffer. Video standards (e.g. H264) require that a certain amount of decoded video be available for referencing (e.g., six to eight frames). By storing at least some video portions in the external buffer, this allows the internal memory to be designed smaller so that the two buffers meet the amount of decoded video storage required by the video standard. A smaller embedded memory is much less expensive financially than a larger embedded memory. Thus, a tradeoff can be made between bandwidth savings by having a larger closer buffer, and financial cost savings by having a smaller closer buffer.

To achieve low bandwidth and power, portions of video consuming more bandwidth should be stored near the decoder 230 or the circuit 295. Internal memory storage is advantageous over external memory storage because sending portions of video a further distance consumes more power. Also, as mentioned above, some video resolutions, such as HD video, consume more memory space than standard video. An internal memory that is large enough for HD video frames is typically too financially expensive for many circuit applications. For example, an H264 video standard requires the decoded picture buffer to store and keep approximately six to eight decoded picture frames available for the decoder for referencing. If each frame is approximately 3 MB, then the storage of six to eight frames would require 18 to 24 MB of memory, which is often too expensive for an internal memory for many circuit applications.

Some video regions do not change over time, and are referred to as being static. Static video regions tend to occur in abundance, especially in high resolution videos. Static video regions contain skipped video portions (e.g., skipped macroblocks), and have a zero motion vector predictor. After decoding a static video portion, the decoded video portion is identical to another decoded video portion. In one embodiment, the identical video portion is a decoded video portion that contains exactly the same pixels as another decoded video portion.

Conventionally, a duplicate "copy" of an identical decoded video portion is made and stored in memory. For example, if five identical macroblocks existed, conventionally the original macroblock and the four copies would all be made and stored in memory. Disadvantages of the conventional approach include the additional bandwidth used to make the four copies, and the additional memory space occupied by the four copies.

In one embodiment, only a single physical location in memory is occupied, and this location represents multiple identical video portions. For example, if five identical macroblocks existed, each of the five macroblocks would be represented in memory by the single memory location. This single memory location is treated as a reference location for each identical video portion. In one embodiment, the look ahead parser 220 marks skipped video portions as "skipped." When the decoder 230 decodes a skipped video portion, the decoder 230 uses the address translator 250 to reference the reference location.

Storing and referencing only a single reference location for identical video portions saves significant bandwidth. Specifically, the only bandwidth consumed is by a read-out by a display-processor (not shown). This approach eliminates all of the other write-out and read-in bandwidth components between the decoder 230 and the memories 270, 290, for the identical video portions. As a result of the bandwidth savings, an accompanying power savings is achieved. Also, memory space and complexity is reduced. The reduction in memory space effectively increases the number of video portions that can reside in the first memory 270. As a result of this reduction, more video portions from the second memory 290 can be stored in the first memory 270, providing additional bandwidth savings.

Figure 3:
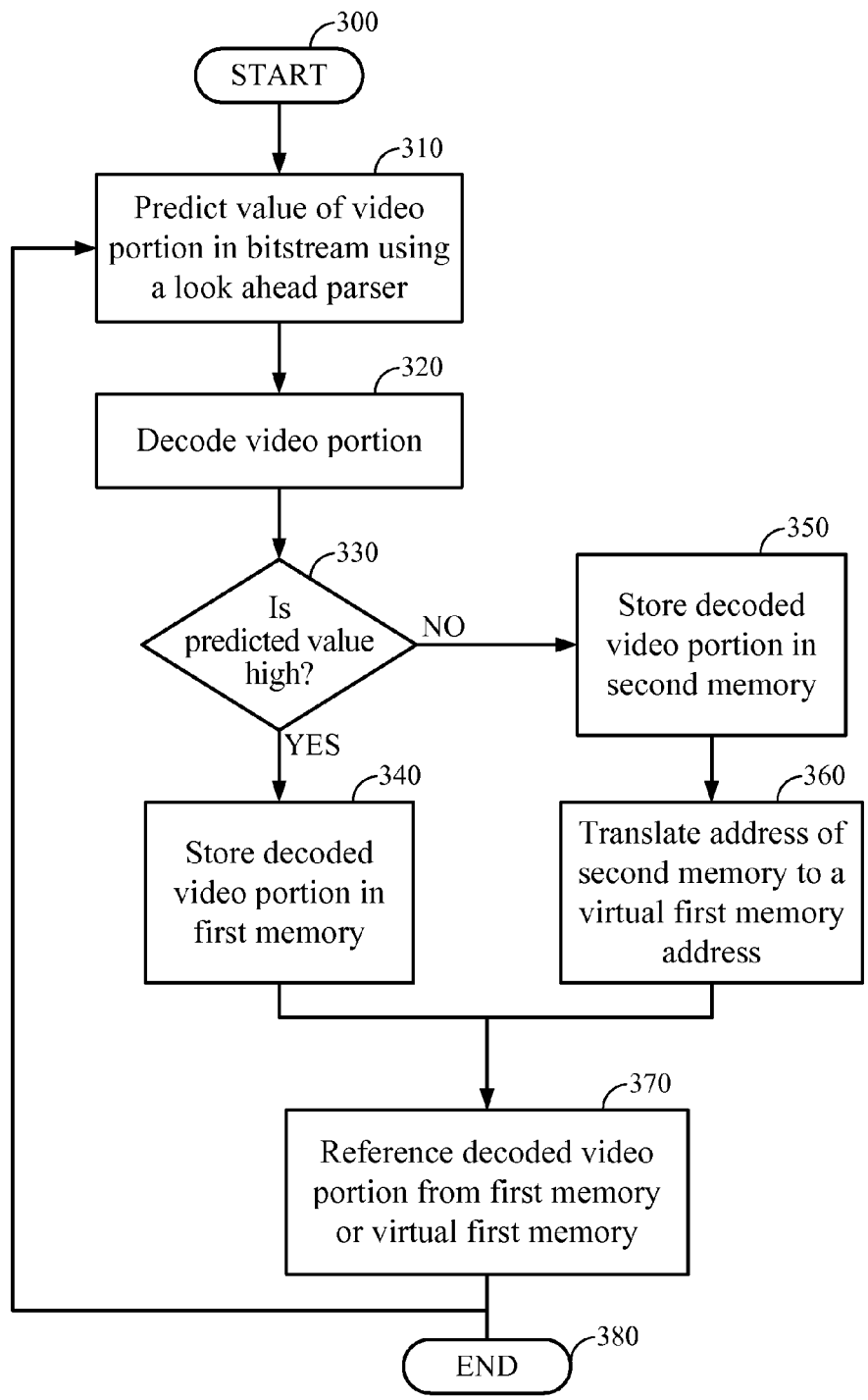
FIG. 3 is a flow chart illustrating a high level process for intelligent decoded picture buffering.

FIG. 3 is a flow chart illustrating a high level process intelligent decoded picture buffering. The process starts at step 300. At step 310, the process predicts a value of a video portion in the encoded bitstream using a look ahead parser. In one embodiment, the look ahead parser can look ahead at a given number of encoded frames using full or partial parsing to predict a bandwidth value of a portion of the frames after decoding.

At step 320, the process decodes the video portion using a decoder. As discussed above, a video portion can be a frame, picture, macroblock, etc. Next, decision step 330 determines whether the predicted value of the video portion is high. If yes, then the process moves to step 340, where the decoded video portion with a high predicted value is stored in a first memory. In one embodiment, the first memory is an internal memory (e.g., eDRAM).

If the answer to decision step 330 is no, then the process moves to step 350, where the process stores the decoded video portion in a second memory. In one embodiment, the second memory is an external memory (e.g., SDRAM). At step 360, the process translates the address of the second memory to a virtual first memory address. In one embodiment, this translation is performed by an address translator. At step 370, the process references the decoded video portion from the first memory or the virtual first memory. Then, the process either loops back to step 310 or the process ends at step 380.

Figure 4:
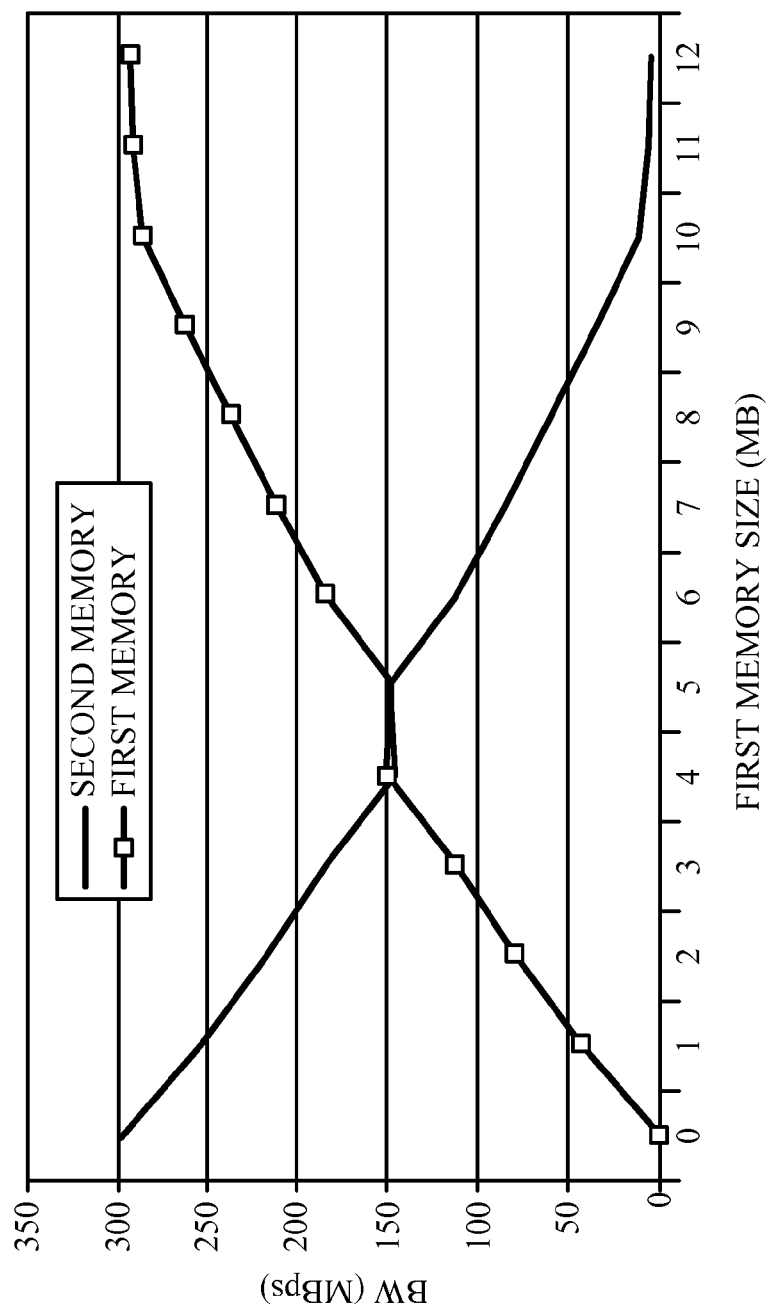
FIG. 4 is a plot illustrating test results of one embodiment for intelligent decoded picture buffering.

FIG. 4 illustrates a plot of test results using intelligent decoded picture buffering. The test conditions include an eDRAM internal memory, an SDRAM external memory, four decoded reference picture frames, where each decoded frame is 1920×1088 resolution (approximately 3 MB each), and therefore the four decoded frames total 12 MB. In addition, the test conditions include H264 compression, IBBPBBP group of frames format, a frame rate of 30 frames/second, a bus width of 64 bits, 4 KB video portions, 64×64 reference pictures, the look ahead parser looking ahead 15 frames ahead of the decoder, and full parsing.

In the y-axis of FIG. 4, bandwidth savings are measured in megabytes per second (mbs). In the x-axis, video portions are measured as megabytes of data in the first memory and the second memory. In this test, the first memory was eDRAM and the second memory was SDRAM.

The results of this test show that bandwidth saving are related to, but not directly proportional to, the amount of data put in the first memory. In this test, when 0 MB of the 12 MB is stored in the first memory (i.e., all 12 MB is in the second memory), there is 0 MBps of bandwidth savings. As more memory is shifted from the second memory to the first memory, bandwidth savings is achieved. For example, when 1 MB of the 12 MB is stored in the first memory (meaning 11 MB of data is in the second memory), a corresponding 50 MBps of bandwidth savings is achieved. When 4 MB (or 5 MB) of the 12 MB is stored in the first memory, a corresponding 250 MBps of bandwidth savings is achieved. In other words, when 30% of the video size (i.e., 4 MB of 12 MB) is stored in the first memory, a 50% bandwidth savings is achieved (i.e., 250 MBps of the 300 MBps). If all 12 MB is stored in the first memory, a corresponding 300 MBps of bandwidth savings is achieved. However, 12 MB of memory may be too costly to store in the first memory. It may be a desirable tradeoff between bandwidth and financial cost, to store less than all of the decoded video portions in the first memory. As a result of the bandwidth and accompanying power savings through the manager's prioritization, large memory applications such as high definition video can be processed.

It is appreciated by the above description that the described embodiments provide intelligent decoded picture buffering of video portions in devices such as mobile stations. Embodiments described can be applied to communications in a dual-mode AMPS and CDMA system. Also, it will be readily apparent to a person of ordinary skill in the art how to apply the invention in similar situations where intelligent buffering is needed.

The general principles of CDMA communication systems, and in particular the general principles for generation of spread spectrum signals for transmission over a communication channel is described in U.S. Pat. No. 4,901,307 entitled "Spread Spectrum Multiple Access Communication System Using Satellite or Terrestrial Repeaters" and assigned to the assignee of the present invention. Moreover, U.S. Pat. No. 5,103,459 entitled "System and Method for Generating Signal Waveforms in a CDMA Cellular Telephone System" and assigned to the assignee of the present invention, discloses principles related to PN spreading, Walsh covering, and techniques to generate CDMA spread spectrum communication signals. Further, embodiments utilize time multiplexing of data and various principles related to "high data rate" communication systems, and the disclosed embodiments can be used in "high data rate" communication systems, such as that disclosed in U.S. patent application entitled "Method and Apparatus for High Rate Packet Data Transmission" Ser. No. 08/963,386 filed on Nov. 3, 1997, and assigned to the assignee of the present invention.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in a computer or electronic storage, in hardware, in a software module executed by a processor, or in a combination thereof. A software module may reside in a computer storage such as in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a mobile station. In the alternative, the processor and the storage medium may reside as discrete components in a mobile station.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A video data buffering system comprising:
    a memory including a first memory and a second memory; and
    a hardware processor configured to:
        predict a value for a portion of video data to be decoded by looking ahead at a first encoded portion of a video data bitstream corresponding to the portion of the video data to be decoded, wherein the value is predicted based on a frequency of reference to the first encoded portion by a plurality of portions subsequent to the first encoded portion in the video data bitstream;
        assign a first value as the predicted value when the frequency of reference is equal to or above a threshold value and assign a second value as the predicted value when the frequency of reference is below the threshold value;
        decode the first encoded portion of the video data bitstream;
        store the decoded portion in a first buffer in the first memory when the assigned value is the first value or in a second buffer in the second memory when the assigned value is the second value, wherein the first buffer has a faster access time than the second buffer;
        subsequent to storing the decoded portion in the first buffer or the second buffer, update the predicted value based on a frequency of reference to the decoded portion by a second encoded portion of the video data bitstream; and
        move the decoded portion between the first buffer and the second buffer based on the updated predicted value, wherein the predicted value for the portion of the video data to be decoded is a predicted bandwidth of the portion of the video data to be decoded, a predicted lifespan of the portion of the video data to be decoded, or a predicted bandwidth variation of the portion of the video data to be decoded over the lifespan.

2. The system of claim 1, wherein the predicted bandwidth of each portion of decoded video data in the first buffer is larger than the predicted bandwidth of each portion of decoded video data in the second buffer.

3. The system of claim 1, wherein the first buffer is a decoded picture buffer, wherein the decoded picture buffer is in an internal memory or an embedded dynamic random access memory ("eDRAM").

4. The system of claim 3, wherein the decoded portion is stored in the internal memory when the predicted bandwidth of the decoded portion of the video data is predicted to be greater than or equal to a threshold.

5. The system of claim 1, wherein the second buffer is a decoded picture buffer, wherein the decoded picture buffer is in an external memory or a synchronous dynamic random access memory ("SDRAM").

6. The system of claim 5, wherein the decoded portion is stored in the external memory when the predicted bandwidth of the portion of the video data to be decoded is predicted to be less than or equal to a threshold.

7. The system of claim 1, wherein each decoded portion in the first buffer was predicted to be referenced more frequently than each decoded portion in the second buffer.

8. The system of claim 1, wherein the predicted value of the portion of the video data to be decoded is a predicted number of times that the portion of the video data to be decoded will be referenced for motion compensation.

9. The system of claim 1, wherein the processor is configured to perform full parsing or partial parsing.

10. The system of claim 1, wherein the decoded portion comprises decoded picture buffer pages, frames, macroblocks, or submacroblocks.

11. A method of buffering video data, the method comprising:
predicting a value for a portion of video data to be decoded by looking ahead at a first encoded portion of a video data bitstream corresponding to the portion of the video data to be decoded, wherein the value is predicted based on a frequency of reference to the first encoded portion by a plurality of portions subsequent to the first encoded portion in the video data bitstream;
assigning a first value as the predicted value when the frequency of reference is equal to or above a threshold value and assigning a second value as the predicted value when the frequency of reference is below the threshold value;
decoding the first encoded portion of the video data bitstream;
determining whether to store the decoded portion in a first buffer in a first memory when the assigned value is the first value or in a second buffer in a second memory when the assigned value is the second value, wherein the first buffer has a faster access time than the second buffer;
subsequent to storing the decoded portion in the first buffer or the second buffer, updating the predicted value based on a frequency of reference to the decoded portion by a second encoded portion of the video data bitstream; and
moving the decoded portion between the first buffer and the second buffer based on the updated predicted value, wherein the predicted value for the portion of the video data to be decoded is a predicted bandwidth of the portion of the video data to be decoded, a predicted lifespan of the portion of the video data to be decoded, or a predicted bandwidth variation of the portion of the video data to be decoded over the lifespan.

12. The method of claim 11, wherein the predicted bandwidth of each portion of decoded video data in the first buffer is larger than the predicted bandwidth of each portion of decoded video data in the second buffer.

13. The method of claim 11, wherein the predicted value of the portion of the video data to be decoded is a predicted number of times that the portion of the video data to be decoded will be referenced for motion compensation.

14. The method of claim 11, wherein the first buffer is a decoded picture buffer, wherein the decoded picture buffer is in an internal memory or an embedded dynamic random access memory ("eDRAM").

15. The method of claim 11, wherein the second buffer is a decoded picture buffer, wherein the decoded picture buffer is in an external memory or a synchronous dynamic random access memory ("SDRAM").

16. The method of claim 11, wherein the first buffer is filled before the second buffer is used.

17. A video data buffering system comprising:
means for predicting a value for a portion of video data to be decoded by looking ahead at a first encoded portion of a video data bitstream corresponding to the portion of the video data to be decoded, the means for predicting the value configured to predict the value based on a frequency of reference to the first encoded portion by a plurality of portions subsequent to the first encoded portion in the video data bitstream;
means for assigning a first value as the predicted value when the frequency of reference is equal to or above a threshold value and assigning a second value as the predicted value when the frequency of reference is below the threshold value;
means for decoding the first encoded portion of the video data bitstream;
means for determining whether to store the decoded portion in a first buffer in a first memory when the assigned value is the first value or in a second buffer in a second memory when the assigned value is the second value, wherein the first buffer has a faster access time than the second buffer;
means for updating the predicted value based on a frequency of reference to the decoded portion by a second encoded portion of the video data bitstream, subsequent to storing the decoded portion in the first buffer or the second buffer; and
means for moving the decoded portion between the first buffer and the second buffer based on the updated predicted value, wherein the predicted value of the portion of the video data to be decoded is a predicted bandwidth of the portion of the video data to be decoded, a predicted lifespan of the portion of the video data to be decoded, or a predicted bandwidth variation of the portion of the video data to be decoded over the lifespan.

18. The system of claim 17, wherein the predicted value of the portion of the video data to be decoded is a predicted number of times that the portion of the video data to be decoded will be referenced for motion compensation.

19. A non-transitory computer readable medium containing instructions that, when executed, cause a computer comprising hardware to perform the acts of:
predicting a value for a portion of video data to be decoded by looking ahead at a first encoded portion of a video data bitstream corresponding to the portion of the video data to be decoded, wherein the value is predicted based on a frequency of reference to the first encoded portion by a plurality of portions subsequent to the first encoded portion in the video data bitstream;
assigning a first value as the predicted value when the frequency of reference is equal to or above a threshold value and assigning a second value as the predicted value when the frequency of reference is below the threshold value;

decoding the first encoded portion of the video data bitstream;

determining whether to store the decoded portion in a first buffer in a first memory when the assigned value is the first value or in a second buffer in a second memory when the assigned value is the second value, wherein the first buffer has a faster access time than the second buffer;

subsequent to storing the decoded portion in the first buffer or the second buffer, updating the predicted value based on a frequency of reference to the decoded portion by a second encoded portion of the video data bitstream: and moving the decoded portion between the first buffer and the second buffer based on the updated predicted value, wherein the predicted value of the portion of the video data to be decoded is a predicted bandwidth, a predicted lifespan of the portion of the video data to be decoded, or a predicted bandwidth variation of the portion of the video data to be decoded over the lifespan.

20. The computer readable medium of claim 19, wherein the predicted value of the portion of the video data to be decoded is a predicted number of times that the portion of the video data to be decoded will be referenced for motion compensation.

* * * * *